(12) United States Patent
Sahlsten et al.

(10) Patent No.: US 9,989,774 B1
(45) Date of Patent: Jun. 5, 2018

(54) DISPLAY APPARATUS AND METHOD OF DISPLAYING USING OPTICAL COMBINERS AND CONTEXT AND FOCUS IMAGE RENDERERS

(71) Applicant: Varjo Technologies Oy, Helsinki (FI)

(72) Inventors: Oiva Arvo Oskari Sahlsten, Salo (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 0 days. days.

(21) Appl. No.: 15/650,807

(22) Filed: Jul. 14, 2017

Related U.S. Application Data (63) Continuation-in-part of application No. 15/366,424, filed on Dec. 1, 2016, now Pat. No. 9,711,072.

(51) Int. Cl.
| | |
|---|---|
| *G06F 1/00* | (2006.01) |
| *G02B 27/10* | (2006.01) |
| *G06T 11/60* | (2006.01) |
| *G02B 27/14* | (2006.01) |
| *G02B 27/01* | (2006.01) |

(52) U.S. Cl.
CPC ..... *G02B 27/1066* (2013.01); *G02B 27/0172* (2013.01); *G02B 27/145* (2013.01); *G06T 11/60* (2013.01)

(58) Field of Classification Search
CPC ..... G06T 19/006; G06T 19/20; G06T 15/503; G06F 3/013; G06K 9/00671
See application file for complete search history.

(56) References Cited

U.S. PATENT DOCUMENTS

| 4,028,725 | A | 6/1977 | Lewis |
| 5,808,589 | A | 9/1998 | Fergason |
| 2016/0240013 | A1* | 8/2016 | Spitzer .................... G06F 3/013 |
| 2016/0342840 | A1* | 11/2016 | Mullins .............. G06K 9/00671 |

FOREIGN PATENT DOCUMENTS

WO 95/21395 A1 8/1995

OTHER PUBLICATIONS

International Search Report and Written Opinion received for International Patent Application No. PCT/FI2017/050830, dated Mar. 20, 2018, 12 pages.

* cited by examiner

*Primary Examiner* — Michael Faragalla
(74) *Attorney, Agent, or Firm* — Ziegler IP Law Group, LLC (57) ABSTRACT

A display apparatus and method of displaying, via the display apparatus. The display apparatus includes context image renderer for rendering context image; focus image renderer for rendering focus image; exit optical element; and optical combiner for optically combining projection of the rendered context image with projection of the rendered focus image to create visual scene. The optical combiner includes first semi-transparent reflective element; and a second semi-transparent reflective element. The context image renderer is arranged in a manner that the projection of rendered context image passes through first semi-transparent reflective element towards exit optical element. The focus image renderer is arranged in a manner that projection of the rendered focus image passes through the first semi-transparent reflective element towards the second semi-transparent reflective element, and reflected therefrom towards the first semi-transparent reflective element, and is then reflected from the first semi-transparent reflective element towards the exit optical element.

10 Claims, 5 Drawing Sheets

DISPLAY APPARATUS AND METHOD OF DISPLAYING USING OPTICAL COMBINERS AND CONTEXT AND FOCUS IMAGE RENDERERS

CROSS-REFERENCE TO RELATED APPLICATIONS

This application is a continuation-in-part of U.S. patent application Ser. No. 15/366,424, titled "DISPLAY APPARATUS AND METHOD OF DISPLAYING USING FOCUS AND CONTEXT DISPLAYS" and filed on Dec. 1, 2016, which is incorporated herein by reference.

TECHNICAL FIELD

The present disclosure relates generally to virtual and augmented reality; and more specifically, to display apparatuses comprising context and focus image renderers, exit optical elements and optical combiners. Furthermore, the present disclosure also relates to methods of displaying via the aforementioned display apparatuses.

BACKGROUND

In recent times, there have been rapid advancements in development and use of technologies such as virtual reality, augmented reality, and so forth, for presenting a simulated environment to a user. Specifically, such technologies provide the user with a feeling of complete involvement (namely, immersion) within the simulated environment by employing contemporary techniques such as stereoscopy. Therefore, such simulated environments provide the user with an enhanced perception of reality around him/her. Moreover, such simulated environments relate to fully virtual environments (namely, virtual reality) as well as real world environments including virtual objects therein (namely, augmented reality).

Typically, the user may use a specialized device, for example, such as a virtual reality device or an augmented reality device, for experiencing such simulated environments. Generally, the virtual and augmented reality devices are binocular devices having separate display optics for each eye of the user. Furthermore, such specialized devices include optical elements therein to render and project constituent images that are employed for presenting the simulated environment to the user. Examples of the virtual reality devices include, head mounted virtual reality devices, virtual reality glasses, and so forth. Furthermore, examples of the augmented reality devices include augmented reality headsets, augmented reality glasses, and so forth.

However, conventional virtual and augmented reality devices have certain limitations. Firstly, such devices are susceptible to introduction of significant chromatic aberrations and optical distortions whilst projecting the constituent images towards the eyes of the user. Such chromatic aberrations and optical distortions severely diminish quality of the user's experience of the simulated environment. Secondly, the optical elements may be arranged in a complex manner within the conventional virtual and augmented reality devices, thereby often introducing obstructions within paths of projection of the constituent images. Thirdly, a field of view of the conventional virtual and augmented reality devices is limited, thereby, limiting the user's experience of the simulated environments. Additionally, due to aforesaid complex arrangement of optical elements, in the conventional virtual and augmented reality devices, multiple optical elements have to be adjusted to change (namely, adjust) size of the projection of images. Furthermore, changing position (namely, location) of the projection of images, in a single or multiple planes, is substantially difficult in such complex arrangements.

Therefore, in light of the foregoing discussion, there exists a need to overcome the aforementioned drawbacks associated with conventional virtual and augmented reality devices.

SUMMARY

The present disclosure seeks to provide a display apparatus. The present disclosure also seeks to provide a method of displaying, via such a display apparatus. The present disclosure seeks to provide a solution to the existing problem of chromatic aberrations and optical distortions in images displayed by conventional virtual and augmented reality devices. An aim of the present disclosure is to provide a solution that overcomes at least partially the problems encountered in the prior art, and provides a robust, reliable and efficient display apparatus.

In one aspect, an embodiment of the present disclosure provides a display apparatus comprising:
  at least one context image renderer for rendering a context image;
  at least one focus image renderer for rendering a focus image;
  an exit optical element; and
  at least one optical combiner for optically combining a projection of the rendered context image with a projection of the rendered focus image to create a visual scene, an angular width of the projection of the rendered context image being greater than an angular width of the projection of the rendered focus image, the at least one optical combiner comprising:
    a first semi-transparent reflective element having a first side and a second side, the first side obliquely facing the exit optical element, the second side facing the at least one context image renderer; and
    a second semi-transparent reflective element obliquely facing the first side of the first semi-transparent reflective element,
  wherein the at least one context image renderer is arranged in a manner that the projection of the rendered context image emanating therefrom passes through the first semi-transparent reflective element towards the exit optical element,
  and wherein the at least one focus image renderer is arranged in a manner that the projection of the rendered focus image emanating therefrom passes through the first semi-transparent reflective element towards the second semi-transparent reflective element, from where the projection of the rendered focus image is reflected towards the first semi-transparent reflective element, and is then reflected from the first side of the first semi-transparent reflective element towards the exit optical element.

In another aspect, an embodiment of the present disclosure provides a method of displaying, via a display apparatus comprising at least one context image renderer, at least one focus image renderer, an exit optical element and at least one optical combiner, the at least one optical combiner comprising a first semi-transparent reflective element and a second semi-transparent reflective element, the first semi-transparent reflective element having a first side obliquely facing the exit optical element and a second side facing the at least one context image renderer, the second semi-transparent reflective element obliquely facing the first side of the first semi-transparent reflective element, the method comprising:

rendering a context image at the at least one context image renderer;

rendering a focus image at the at least one focus image renderer; and using the at least one optical combiner to optically combine a projection of the rendered context image with a projection of the rendered focus image to create a visual scene, an angular width of the projection of the rendered context image being greater than an angular width of the projection of the rendered focus image, wherein the at least one context image renderer is arranged in a manner that the projection of the rendered context image emanating therefrom passes through the first semi-transparent reflective element towards the exit optical element, and wherein the at least one focus image renderer is arranged in a manner that the projection of the rendered focus image emanating therefrom passes through the first semi-transparent reflective element towards the second semi-transparent reflective element, from where the projection of the rendered focus image is reflected towards the first semi-transparent reflective element, and is then reflected from the first side of the first semi-transparent reflective element towards the exit optical element.

Embodiments of the present disclosure substantially eliminate or at least partially address the aforementioned problems in the prior art, and enables elimination of chromatic aberrations and optical distortions in images displayed by display apparatuses.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:

at least one context image renderer for rendering a context image;

at least one focus image renderer for rendering a focus image;

an exit optical element; and at least one optical combiner for optically combining a projection of the rendered context image with a projection of the rendered focus image to create a visual scene, an angular width of the projection of the rendered context image being greater than an angular width of the projection of the rendered focus image, the at least one optical combiner comprising:

a first semi-transparent reflective element having a first side and a second side, the first side obliquely facing the exit optical element, the second side facing the at least one context image renderer; and a second semi-transparent reflective element obliquely facing the first side of the first semi-transparent reflective element, wherein the at least one context image renderer is arranged in a manner that the projection of the rendered context image emanating therefrom passes through the first semi-transparent reflective element towards the exit optical element, and wherein the at least one focus image renderer is arranged in a manner that the projection of the rendered focus image emanating therefrom passes through the first semi-transparent reflective element towards the second semi-transparent reflective element, from where the projection of the rendered focus image is reflected towards the first semi-transparent reflective element, and is then reflected from the first side of the first semi-transparent reflective element towards the exit optical element.

In another aspect, an embodiment of the present disclosure provides a method of displaying, via a display apparatus comprising at least one context image renderer, at least one focus image renderer, an exit optical element and at least one optical combiner, the at least one optical combiner comprising a first semi-transparent reflective element and a second semi-transparent reflective element, the first semi-transparent reflective element having a first side obliquely facing the exit optical element and a second side facing the at least one context image renderer, the second semi-transparent reflective element obliquely facing the first side of the first semi-transparent reflective element, the method comprising:

rendering a context image at the at least one context image renderer;

rendering a focus image at the at least one focus image renderer; and using the at least one optical combiner to optically combine a projection of the rendered context image with a projection of the rendered focus image to create a visual scene, an angular width of the projection of the rendered context image being greater than an angular width of the projection of the rendered focus image, wherein the at least one context image renderer is arranged in a manner that the projection of the rendered context image emanating therefrom passes through the first semi-transparent reflective element towards the exit optical element, and wherein the at least one focus image renderer is arranged in a manner that the projection of the rendered focus image emanating therefrom passes through the first semi-transparent reflective element towards the second semi-transparent reflective element, from where the projection of the rendered focus image is reflected towards the first semi-transparent reflective element, and is then reflected from the first side of the first semi-transparent reflective element towards the exit optical element.

The present disclosure provides the aforementioned display apparatus and the aforementioned method of displaying, via such a display apparatus. The display apparatus described herein allows for elimination of chromatic aberrations and optical distortions in images displayed by the display apparatus. Furthermore, the display apparatus facilitates change (namely, adjustment) in size of the images projected thereby, via minimal adjustment of optical elements employed in the display apparatus. Additionally, arrangement of optical elements in the display apparatus provides minimal obstruction in path of the images projected therein. Beneficially, the aforesaid arrangement of optical elements in the display apparatus allows for a larger field of view thereof, thereby, providing a user of the display apparatus with a greater feeling of immersion within the visual scene. Moreover, position of the images projected within the display apparatus may be changed relatively easily in single or multiple planes.

As mentioned previously, the at least one context image renderer renders the context image and the at least one focus image renderer renders the focus image.

Throughout the present disclosure, the term "context image" relates to an image of the visual scene, to be rendered and projected via the display apparatus. Furthermore, throughout the present disclosure, the term "focus image" relates to another image depicting a part (namely, a portion) of the visual scene, to be rendered and projected via the display apparatus. Therefore, it is to be understood that the focus image is dimensionally smaller than the context image.

It will be appreciated that the context and focus images described herein, are employed to present the visual scene of a simulated environment (for example, such as a virtual reality environment, an augmented reality environment, and so forth) to a user of the display apparatus, when the display apparatus is worn by the user. In such an instance, the display apparatus is operable to act as a device (for example, such as a virtual reality headset, a pair of virtual reality glasses, an augmented reality headset, a pair of augmented reality glasses and the like) for presenting the simulated environment to the user.

As mentioned previously, the angular width of the projection of the rendered context image is greater than the angular width of the projection of the rendered focus image. Optionally, the angular width of the projection of the rendered context image ranges from 40 degrees to 220 degrees, whereas an angular width of a projection of the rendered focus image ranges from 5 degrees to 60 degrees.

Throughout the present disclosure, the term "angular width" refers to an angular width of a given projection as seen from the user's eyes, when the display apparatus is worn by the user. It will be appreciated that the angular width of the projection of the rendered context image is greater than the angular width of the projection of the rendered focus image since the rendered focus image is typically projected on and around the fovea of the user's eyes, whereas the rendered context image is projected upon the retina of the user's eyes.

Throughout the present disclosure, the term "context image renderer" relates to equipment configured to facilitate rendering of the context image, whereas the term "focus image renderer" relates to equipment configured to facilitate rendering of the focus image.

Optionally, the context image renderer and/or the focus image renderer are implemented by way of at least one projector and a projection screen associated therewith.

Optionally, the context image renderer is implemented by way of at least one context display configured to emit the projection of the rendered context image therefrom. Similarly, optionally, the focus image renderer is implemented by way of at least one focus display configured to emit the projection of the rendered focus image therefrom.

As mentioned previously, the at least one optical combiner optically combines the projection of the rendered context image with the projection of the rendered focus image to create the visual scene. The at least one optical combiner comprises the first semi-transparent reflective element and the second semi-transparent reflective element.

Throughout the present disclosure, the term "at least one optical combiner" relates to equipment for optically combining at least the projection of the rendered context image with the projection of the rendered focus image to create the visual scene. It will be appreciated that the at least one optical combiner includes optical and/or mechanical elements (for example, such as, beam splitters, semi-transparent mirrors, prisms, waveguides, polarizers, actuators, and the like) in order to implement the aforesaid optical combination operation.

Furthermore, the first semi-transparent reflective element has the first side and the second side, the first side obliquely facing the exit optical element, and the second side facing the at least one context image renderer. It will be appreciated that the aforesaid oblique facing arrangement of the first side of the first semi-transparent reflective element with regards to the exit optical element allows for the first side to substantially face the exit optical element. Furthermore, it will be appreciated that the second side may face the at least one context image renderer obliquely or parallely.

In an embodiment, the first and second sides of the first semi-transparent reflective element are opposite to each other. In another embodiment, the first and second sides of the first semi-transparent reflective element are adjacent to each other.

Optionally, the first side of the first semi-transparent reflective element is substantially reflective.

Moreover, optionally, the second side of the first semi-transparent reflective element is substantially transmissive.

Furthermore, optionally, the first semi-transparent reflective element has a third side facing the at least one focus image renderer. Optionally, in this regard, the first side, the second side, and the third side of the first semi-transparent reflective element are adjacent to each other.

Optionally, the third side of the semi-transparent reflective element is substantially transmissive, reflective, or a combination thereof.

Optionally, the first semi-transparent reflective element is implemented by way of at least one of: a semi-transparent mirror, a semi-transparent film, a beam splitter, a prism, a polarizer, a lens, an optical waveguide. In an example, the semi-transparent mirror for implementing the first semi-transparent reflective element may be a pellicle mirror.

As an example, the first semi-transparent reflective element could be implemented by way of a semi-transparent mirror, wherein the first and second sides of the semi-transparent mirror are opposite to each other. Optionally, in such an example, the first side of the semi-transparent mirror may be substantially reflective whereas the second side of the semi-transparent mirror may be substantially transmissive.

As another example, the first semi-transparent reflective element could be implemented by way of a prism, wherein the first side of the prism may obliquely face the exit optical element and may be substantially reflective, whereas, the second side of the prism may parallely face the at least one context image renderer and may be substantially transmissive. Furthermore, optionally, in such an example, the prism may have a third side facing the at least one focus image renderer, wherein the third side may be substantially transmissive. Optionally, in this regard, the first side, the second side and the third side of the prism may be adjacent to each other.

Optionally, the first semi-transparent reflective element is static. In such an instance, a position of the first semi-transparent reflective element within the display apparatus is fixed. It will be appreciated that the aforesaid static arrangement (namely, placement) of the first semi-transparent reflective element allows for simplification of optical paths of the projection of the rendered context image and the projection of the rendered focus image. Beneficially, such a static first semi-transparent reflective element allows for reduction in geometric and chromatic aberrations within the display apparatus. Consequently, optical distortion of the focus and context images is substantially minimized.

As mentioned previously, the at least one optical combiner comprises the second semi-transparent reflective element obliquely facing the first side of the first semi-transparent reflective element. It will be appreciated that the aforesaid oblique facing arrangement of the second semi-transparent reflective element with regards to the first side of the first semi-transparent reflective element allows for the second semi-transparent reflective element to substantially face the first side of the first semi-transparent reflective element.

Optionally, the second semi-transparent reflective element is implemented by way of at least one of: a semi-transparent mirror, a semi-transparent film, a fully reflective mirror, a beam splitter, a prism, a polarizer, a lens, an optical waveguide. In an example, the second semi-transparent reflective element is implemented by way of the fully reflective mirror. In such an instance, the fully reflective mirror may be semi-transparent.

In an embodiment, the second semi-transparent reflective element is curved in shape. It will be appreciated that the curve of the second semi-transparent reflective element can be in any suitable direction and shape, for example such as an outside-in hemisphere, an inside-out hemisphere, a parabolic shape, and so forth. Beneficially, the curved shape of the second semi-transparent reflective element allows for a potential increase in field of view of the display apparatus and allows for a reduction in size of the display apparatus. It will be appreciated that the curved shape of the second semi-transparent reflective element also allows for a reduction in geometric and chromatic aberrations occurring within the display apparatus.

In another embodiment, the second semi-transparent reflective element is flat (namely, planar) in shape. In yet another embodiment, the second semi-transparent reflective element is freeform in shape. Optionally, in this regard, the freeform shape is implemented as a combination of flat and curved surfaces including protrusions and depressions on a surface of the second semi-transparent reflective element.

As mentioned previously, in the display apparatus, the at least one context image renderer is arranged in a manner that the projection of the rendered context image emanating therefrom passes through the first semi-transparent reflective element towards the exit optical element. It will be appreciated that in such an instance, optical properties (namely, transmission and/or reflection characteristics) the first semi-transparent reflective element, allow for controlling the optical path of the projection of the rendered context image, in the aforesaid manner.

In an exemplary implementation, the projection of the rendered context image is incident upon the second side of the first semi-transparent reflective element. Optionally, the second side of the first semi-transparent reflective element is substantially transmissive and allows the projection of the rendered context image to pass through the first semi-transparent reflective element. Furthermore, the projection of the rendered context image exits the first semi-transparent reflective element from the first side thereof, and is directed towards the exit optical element.

Furthermore, in the display apparatus, the at least one focus image renderer is arranged in a manner that the projection of the rendered focus image emanating therefrom passes through the first semi-transparent reflective element towards the second semi-transparent reflective element, from where the projection of the rendered focus image is reflected towards the first semi-transparent reflective element, and is then reflected from the first side of the first semi-transparent reflective element towards the exit optical element. It will be appreciated that in such an instance, optical properties (namely, transmission and/or reflection characteristics) the first semi-transparent reflective element and the second semi-transparent reflective element, allow for controlling the optical path of the projection of the rendered focus image, in the aforesaid manner.

In an exemplary implementation, the projection of the rendered focus image is incident upon the second side of the first semi-transparent reflective element. Optionally, the second side of the first semi-transparent reflective element is substantially transmissive and allows the projection of the rendered focus image to pass through the first semi-transparent reflective element. Furthermore, the projection of the rendered focus image exits the first semi-transparent reflective element from the first side thereof, and is directed towards the second semi-transparent reflective element. The projection of the rendered focus image is incident upon the second semi-transparent reflective element, and is reflected therefrom. Consequently, upon the aforementioned reflection from the second semi-transparent reflective element, the projection of the rendered focus image is directed towards the first side of the first semi-transparent reflective element. Optionally, the first side of the first semi-transparent reflective element is substantially reflective, and reflects the projection of the rendered focus image towards the exit optical element.

In another exemplary implementation, the projection of the rendered focus image is incident upon the third side of the first semi-transparent reflective element. Optionally, the third side of the first semi-transparent reflective element is substantially transmissive and allows the projection of the rendered focus image to pass through the first semi-transparent reflective element, towards the second semi-transparent reflective element. Optionally, in such a case, the projection of the rendered focus image exits the first semi-transparent reflective element from the first side thereof, and is directed towards the second semi-transparent reflective element. The projection of the rendered focus image is incident upon the second semi-transparent reflective element, and is reflected therefrom. Consequently, upon the aforementioned reflection from the second semi-transparent reflective element, the projection of the rendered focus image is directed towards the first side of the first semi-transparent reflective element. Optionally, the first side of the first semi-transparent reflective element is substantially reflective, and reflects the projection of the rendered focus image towards the exit optical element.

Throughout the present disclosure, the term "exit optical element" relates to an optical device configured to direct the projection of the rendered context image and the projection of the rendered focus image, towards the eyes of the user of the display apparatus, when the display apparatus is worn by the user.

Optionally, the exit optical element receives the projection of the rendered context image and the projection of the rendered focus image, from the first semi-transparent reflective element, and modifies an optical path and/or optical characteristics of at least one of the projection of the rendered context image and the projection of the rendered focus image, prior to directing the aforesaid projections onto the eyes of the user. In one example, the exit optical element may magnify a size (or angular dimensions) of the projection of the rendered focus image. In such a case, use of a magnifying optical element allows for use of dimensionally small components within the display apparatus.

Furthermore, optionally, the exit optical element is implemented by way of at least one of: a convex lens, a plano-convex lens, a Liquid Crystal (LC) lens, a liquid lens, a Fresnel lens, aspherical lens, achromatic lens.

Optionally, the exit optical element has a curved surface facing the first semi-transparent reflective element. In such an instance, the curved surface may be convex (namely, bulging towards the first semi-transparent reflective element) or concave (namely, bulging inwards, away from the first semi-transparent reflective element).

Optionally, the at least one optical combiner further comprises at least one first actuator for moving the second semi-transparent reflective element, the display apparatus further comprising a processor coupled to the at least one first actuator, the processor being configured to control the at least one first actuator to adjust a tilt of the second semi-transparent reflective element to change a location of the projection of the rendered focus image incident upon the exit optical element. In such an instance, the processor may control the at least one first actuator by generating an actuation signal (such as an electric current, hydraulic pressure, mechanical power, and so forth). It will be appreciated that by employing the at least one first actuator, the location of the projection of the rendered focus image can be changed (namely, adjusted) without moving the at least one focus image renderer. Beneficially, the at least one first actuator adjusts the tilt of the second semi-transparent reflective element, to adjust the location of the projection of the rendered focus image along a single plane (namely, either horizontally or vertically) or along multiple planes (namely, both horizontally and vertically).

Optionally, such movement of the second semi-transparent reflective element further comprises at least one of: displacement of the second semi-transparent reflective element, rotation of the second semi-transparent reflective element.

Optionally, the second semi-transparent reflective element is tilted about a first axis.

Optionally, the second semi-transparent reflective element is tilted about the first axis and a second axis.

The processor could be implemented by way of hardware, software, firmware or a combination thereof, suitable for controlling the operation of the display apparatus. Optionally, the processor is configured to control the operation of the display apparatus to present (namely, to project) the visual scene onto the eyes of the user. Furthermore, the processor may or may not be external to the device.

Optionally, the at least one optical combiner further comprises at least one second actuator for moving the at least one focus image renderer, the processor being coupled to the at least one second actuator, the processor being configured to control the at least one second actuator to adjust a tilt of the at least one focus image renderer to change the location of the projection of the rendered focus image incident upon the exit optical element. In such an instance, the processor may control the at least one second actuator by generating an actuation signal (such as an electric current, hydraulic pressure, mechanical power, and so forth). It will be appreciated that by employing the at least one second actuator, the location of the projection of the rendered focus image can be changed (namely, adjusted) by moving the at least one focus image renderer. Beneficially, the at least one second actuator adjusts the tilt of the at least one focus image renderer, to adjust the location of the projection of the rendered focus image along a single plane (namely, either horizontally or vertically) or along multiple planes (namely, both horizontally and vertically).

Optionally, such movement of the at least one focus image renderer further comprises at least one of: displacement of the at least one focus image renderer, rotation of the at least one focus image renderer.

Optionally, the at least one focus image renderer is tilted about the second axis.

Optionally, the second semi-transparent reflective element is tilted about the first axis, whereas the at least one focus image renderer is tilted about the second axis.

Optionally, the first side of the first semi-transparent reflective element has polarizing properties. Optionally, in this regard, the first side of the first semi-transparent reflective element is configured to allow only light waves of a predefined polarization orientation to pass therethrough, whilst blocking (namely, via reflecting, absorbing, or a combination thereof) light waves of other polarization orientations.

More optionally, the polarizing properties of the first side of the first semi-transparent reflective element comprise at least the predefined polarization orientation associated with the first side of the first semi-transparent reflective element.

Optionally, the polarizing properties of the first side of the first semi-transparent reflective element are adjustable. Optionally, the polarization properties of the first side of the first semi-transparent reflective element are manually adjustable. Alternatively, optionally, the processor is configured to perform (namely, implement) the aforesaid adjustment.

Furthermore, optionally, the first side of the first semi-transparent reflective element is implemented by way of at least one of: thin film polarizer, Polaroid@ polarizing filter, absorptive crystal polarizer, birefringent polarizer. As an example, the first side of the first semi-transparent reflective element may be implemented by way of a thin film polarizer including a substrate (for example, such as glass, plate, mirror, prism, waveguide, and the like) whereon a thin film of a specialized optical coating is applied. In such a case, the specialized optical coating (for example, such as a dielectric material) may be configured to implement the desired polarization effect. As another example, the first side of the first semi-transparent reflective element may be implemented as a birefringent polarizer (for example, such as a Liquid Crystal variable retarder).

Optionally, the display apparatus further comprises a polarization retarder or retardation layer positioned between the first semi-transparent reflective element and the second semi-transparent reflective element. The polarization retarder or retardation layer is employed in an instance when the first side of the first semi-transparent reflective element optionally has polarizing properties. In such a case, a combination of properties of the polarization retarder or retardation layer and the polarizing properties of the first side of the first semi-transparent reflective element, allow for achieving a desired polarization effect within the display apparatus.

Therefore, throughout the present disclosure, the term "polarization retarder or retardation layer" relates to an optical element configured to alter a polarization orientation of light waves incident thereupon.

More optionally, optical retardance of the polarization retarder or retardation layer is one of: n/2 (namely, 90 degrees), or n (namely, 180 degrees).

In an exemplary implementation, the display apparatus may comprise a quarter wave retardation layer positioned between the first semi-transparent reflective element and the second semi-transparent reflective element. In such an example, the first side of the first semi-transparent reflective element may be configured to allow only s-polarized light waves to pass therethrough, whilst blocking the light waves of other polarization orientations. Therefore, in such an example, s-polarized light waves within the projection of the rendered context image emanating from the at least one context image renderer may pass through the first semi-transparent reflective element, towards the exit optical element. Furthermore, in such an example, s-polarized light waves within the projection of the rendered focus image emanating from the at least one focus image renderer may pass through the first semi-transparent reflective element, towards the second semi-transparent reflective element. Such s-polarized light waves within the projection of the rendered focus image are incident on the quarter wave retardation layer that is configured to alter polarization orientation of the s-polarized light waves into p-polarization. Therefore, p-polarization light waves of the projection of the rendered focus image are incident upon the second semi-transparent reflective element, and are reflected therefrom, towards the first semi-transparent reflective element. Consequently, when p-polarized light waves of the projection of the rendered focus image are incident upon the first side of the first semi-transparent reflective element, the projection of the rendered focus image is reflected from the first side, towards the exit optical element.

Optionally, the at least one context image renderer is arranged to allow a projection of a real-world scene to pass through towards the first semi-transparent reflective element, whereat the projection of the real-world scene is optically combined with the projection of the rendered context image and the projection of the rendered focus image to create the visual scene. It will be appreciated that in such a case, the visual scene created by the aforesaid optical combination presents the simulated environment (for example, such as the augmented reality environment) to the user of the display apparatus. Optionally, in such an instance, the at least one context image renderer is substantially transparent (namely, has substantial transmissive properties) to allow the projection of a real-world scene to pass therethrough.

Optionally, in this regard, the display apparatus further comprises at least one optical filter for adjusting light transmittance of the projection of the real-world scene passing through the at least one optical filter, wherein the at least one optical filter is positioned behind the at least one context image renderer. More optionally, the at least one optical filter is implemented by way of an LC shutter.

Optionally, the display apparatus further comprises a means for detecting a gaze direction coupled in communication with the processor, wherein the processor is further coupled in communication with the at least one optical combiner, and wherein the processor is configured to:

(a) obtain an input image, and use the detected gaze direction to determine a region of visual accuracy of the input image;

(b) process the input image to generate the context image and the focus image, the context image having a first resolution and the focus image having a second resolution, wherein:

(i) a region of the context image that substantially corresponds to the region of visual accuracy of the input image is masked, (ii) the focus image substantially corresponds to the region of visual accuracy of the input image, and (iii) the second resolution is higher than the first resolution; and (c) render the context image at the at least one context image renderer and the focus image at the at least one focus image renderer substantially simultaneously, whilst controlling the at least one first optical combiner to combine the projection of the rendered context image with the projection of the rendered focus image in a manner that the projection of the rendered focus image substantially overlaps the projection of the masked region of the rendered context image.

Throughout the present disclosure, the term "means for detecting a gaze direction" relates to specialized equipment for detecting and/or following a direction of gaze of the user of the display apparatus, when the user of the display apparatus views the visual scene. Examples of the means for detecting the gaze direction include contact lenses with sensors, cameras monitoring position of pupil of the eye, and so forth. Beneficially, an accurate detection of the gaze direction facilitates the display apparatus to closely implement gaze contingency thereon.

It is to be understood that the means for detecting the gaze direction may also be referred to as an "eye-tracker system", a "gaze-tracking unit", or a "gaze-tracking system".

Optionally, the means for detecting the gaze direction is positioned behind the at least one context image renderer, wherein the at least one context image renderer is substantially transparent. It will be appreciated that such an arrangement of the means for detecting the gaze direction allows for an optimal alignment between such means for detecting the gaze direction and the user's eyes, without causing obstructions in the optical path of the projection of the rendered context image.

Throughout the present disclosure, the term "input image" used herein relates to an image (for example, such as an image depicting the visual scene of a simulated environment) to be displayed via the display apparatus. In an embodiment, the input image depicts a fully simulated environment that is employed to present the visual scene of the virtual reality environment. In another embodiment, the input image depicts at least one virtual object, to be superimposed on the projection of the real-world scene, that are collectively employed to present the visual scene of the augmented reality environment.

Examples of the at least one virtual object include, but are not limited to, a virtual navigation tool (for example, such as a virtual map, virtual direction signage, and so forth), a virtual gadget (for example, such as a virtual calculator, a virtual computer, and so forth), a virtual message (for example, such as a virtual instant message, a virtual chat conversation, a virtual to-do note), a virtual entity (for example, such as a virtual person, a virtual animal, and so forth), and a virtual media (for example, such as a virtual video, a virtual interactive advertisement, a virtual news, virtual data, and so forth).

Furthermore, it will be appreciated that the term "region of visual accuracy" used herein refers to a region of the input image whereat the detected gaze direction of the eye may be focused when the user views the visual scene. It will be appreciated that the region of visual accuracy is a fixation region within the visual scene. Therefore, the region of visual accuracy is a region of focus of the user's gaze within the visual scene. Furthermore, it is to be understood that the region of visual accuracy is resolved to a much greater detail as compared to other regions of visual scene, when the visual scene is viewed by a human visual system (namely, by the user's eyes).

As mentioned previously, optionally, the second resolution (of the focus image) is higher than the first resolution (of the context image) since the rendered focus image is typically projected by the display apparatus on and around the fovea of the user's eyes, whereas the rendered context image is projected by the display apparatus upon the retina of the user's eyes. Such resolution of the focus and context images allow for emulating visual characteristics of the human visual system when the visual scene is viewed by the user of the display apparatus.

Furthermore, optionally, the region of visual accuracy of the input image is represented within both the rendered context image of low resolution and the rendered focus image of high resolution. Moreover, the rendered focus image having a high resolution may include more information pertaining to the region of visual accuracy of the input image, as compared to the rendered context image having a low resolution. Therefore, it will be appreciated that the processor optionally masks the region of the context image that substantially corresponds to the region of visual accuracy of the input image in order to avoid optical distortion of the region of visual accuracy, when the projection of the focus image is combined with the projection of the rendered context image.

Moreover, it is to be understood that physical size (or dimensions) of the at least one context image renderer and the at least one focus image renderer may not limit operation of the display apparatus described hereinabove. Optionally, physically small sized context image renderer and focus image renderer may be used along with a lens (for example, such as an enlarging lens) in the optical paths of the projections of the rendered context and focus images to ensure desired size and/or desired optical path of the projections thereof. As an example, a lens (for example, such as a convex lens) may be positioned on the optical path of the projection of the rendered focus image.

The present disclosure also relates to the method as described above. Various embodiments and variants disclosed above apply mutatis mutandis to the method.

DETAILED DESCRIPTION OF THE DRAWINGS

Referring to FIGS. 1-4, illustrated are exemplary implementations of a display apparatus, in accordance with various embodiments of the present disclosure. It is to be understood by a person skilled in the art that the FIGS. 1-4 include simplified arrangements for implementation of the display apparatus for the sake of clarity, which should not unduly limit the scope of the claims herein. The person skilled in the art will recognize many variations, alternatives, and modifications of embodiments of the present disclosure.

Figure 1:
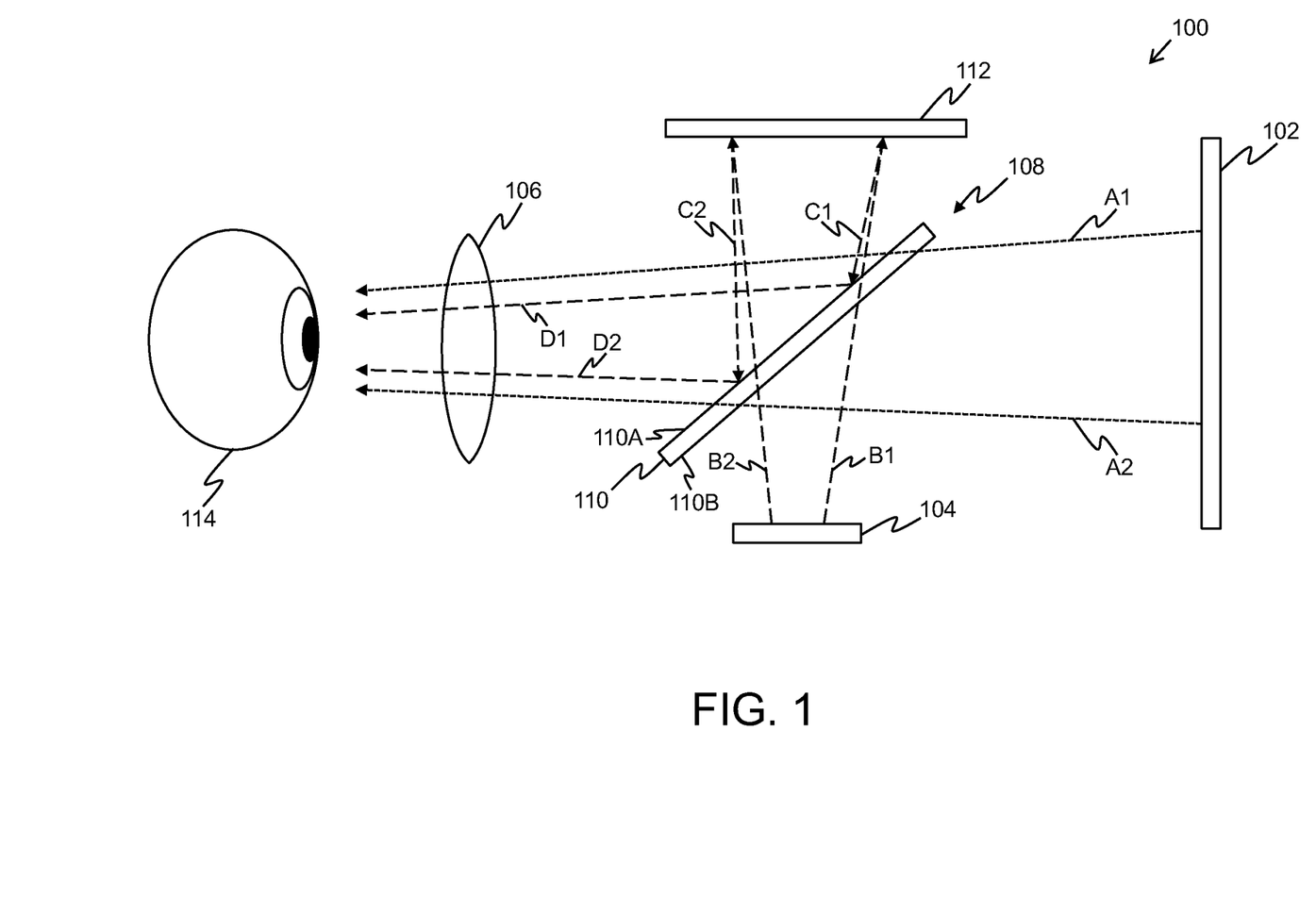
FIGS. 1-4 are exemplary implementations of a display apparatus, in accordance with various embodiments of the present disclosure.

Referring to FIG. 1, illustrated is an exemplary implementation of a display apparatus 100, in accordance with an embodiment of the present disclosure. The display apparatus 100 comprises at least one context image renderer, depicted as a context image renderer 102, at least one focus image renderer, depicted as a focus image renderer 104, an exit optical element 106, and at least one optical combiner, depicted as an optical combiner 108. Optionally, the context image renderer 102 and the focus image renderer 104 are implemented by way of a context display and a focus display respectively. The at least one optical combiner 108 optically combines a projection of the rendered context image with a projection of the rendered focus image to create a visual scene. The angular width of the rendered context image is greater than an angular width of the projection of the rendered focus image. As shown, the at least one optical combiner 108 comprises a first semi-transparent reflective element 110 and a second semi-transparent reflective element 112. The first semi-transparent reflective element 110 has a first side 110A and a second side 110B, the first side 110A obliquely facing the exit optical element 106, the second side 110B facing the at least one context image renderer 102. The second semi-transparent reflective element 112 obliquely faces the first side 110A of the first semi-transparent reflective element 110. As an example, the first semi-transparent reflective element 110 is implemented by way of a semi-transparent mirror.

Furthermore, in FIG. 1, the at least one context image renderer 102 is arranged in a manner that the projection of the rendered context image emanating therefrom, depicted as rays A1 and A2, passes through the first semi-transparent reflective element 110 towards the exit optical element 106. The at least one focus image renderer 104 is arranged in a manner that the projection of the rendered focus image emanating therefrom, depicted as rays B1 and B2, passes through the first semi-transparent reflective element 110 towards the second semi-transparent reflective element 112, from where the projection of the rendered focus image B1-B2 is reflected towards the first semi-transparent reflective element 110, depicted as rays C1 and C2, and is then reflected from the first side 110A of the first semi-transparent reflective element 110 towards the exit optical element 106, depicted as rays D1 and D2. The rays A1-A2 depicting the projection of the rendered context image, and the rays D1-D2 depicting the projection of the rendered focus image, are directed towards an eye 114 of a user of the display apparatus 100.

Figure 2:
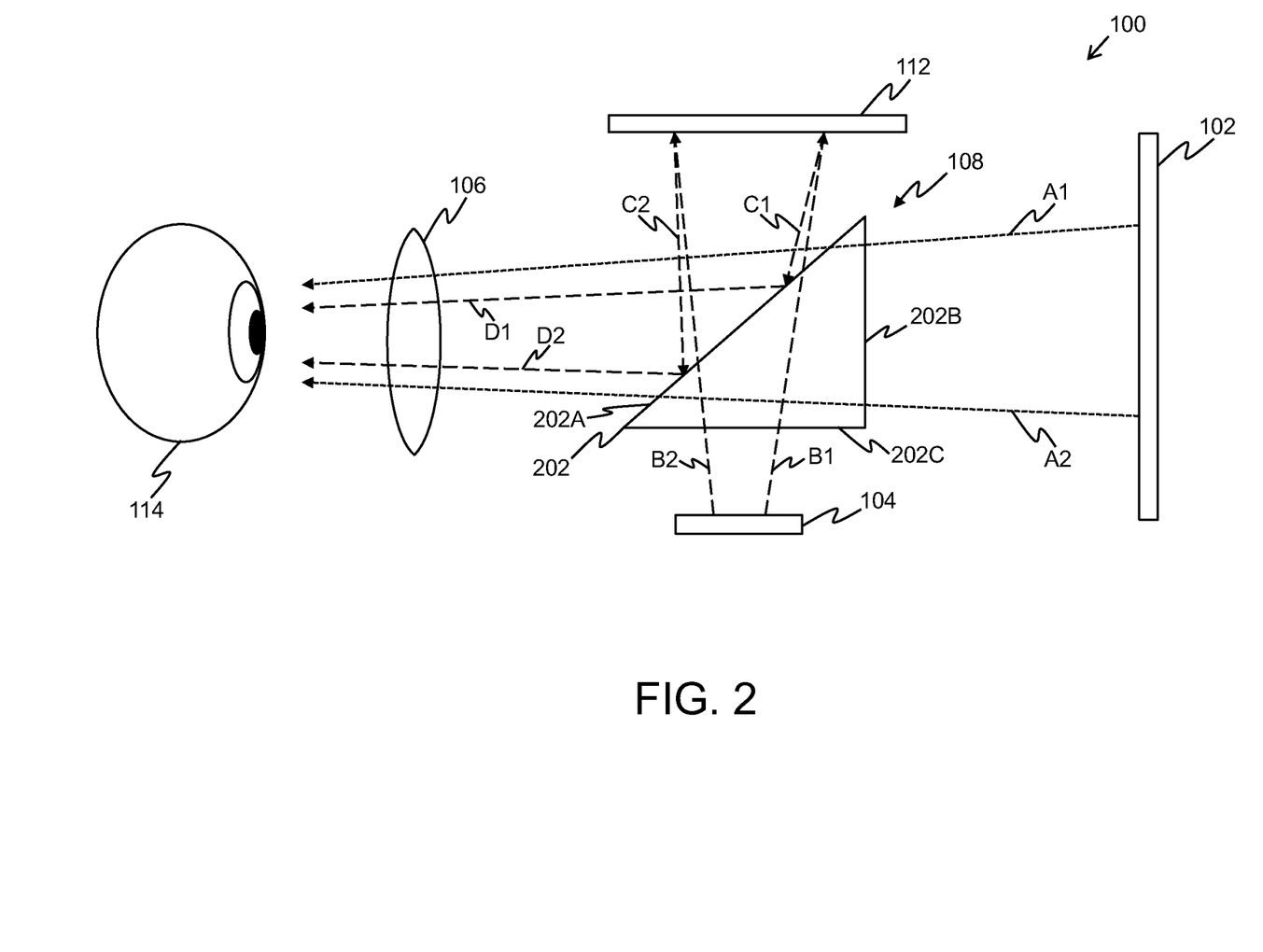

Referring to FIG. 2, illustrated is an exemplary implementation of the display apparatus 100, in accordance with another embodiment of the present disclosure. The display apparatus 100 is shown to include the at least one context image renderer 102, the at least one focus image renderer 104, the exit optical element 106, and the at least one optical combiner 108. As shown, the at least one optical combiner 108 comprises a first semi-transparent reflective element 202 and the second semi-transparent reflective element 112. The first semi-transparent reflective element 202 has a first side 202A and a second side 202B, the first side 202A side obliquely facing the exit optical element 106, the second side 202B facing the at least one context image renderer 102. As shown, the first semi-transparent reflective element 202 optionally has a third side 202C facing the at least one focus image renderer 104. As an example, the first semi-transparent reflective element 202 is implemented by way of a prism.

Furthermore, in the FIG. 2, the first side 202A, the second side 202B, and the third side 202C of the first semi-transparent reflective element 202 are adjacent to each other. Furthermore, as shown, the projection of the rendered focus image emanating therefrom, depicted as the rays B1-B2, is incident upon the third side 202C of the first semi-transparent reflective element 202 while passing through the first semi-transparent reflective element 202 towards the second semi-transparent reflective element 112. Furthermore, the rays A1-A2 depicting the projection of the rendered context image, and the rays D1-D2 depicting the projection of the rendered focus image, are directed towards the eye 114 of the user of the display apparatus 100.

Figure 3:
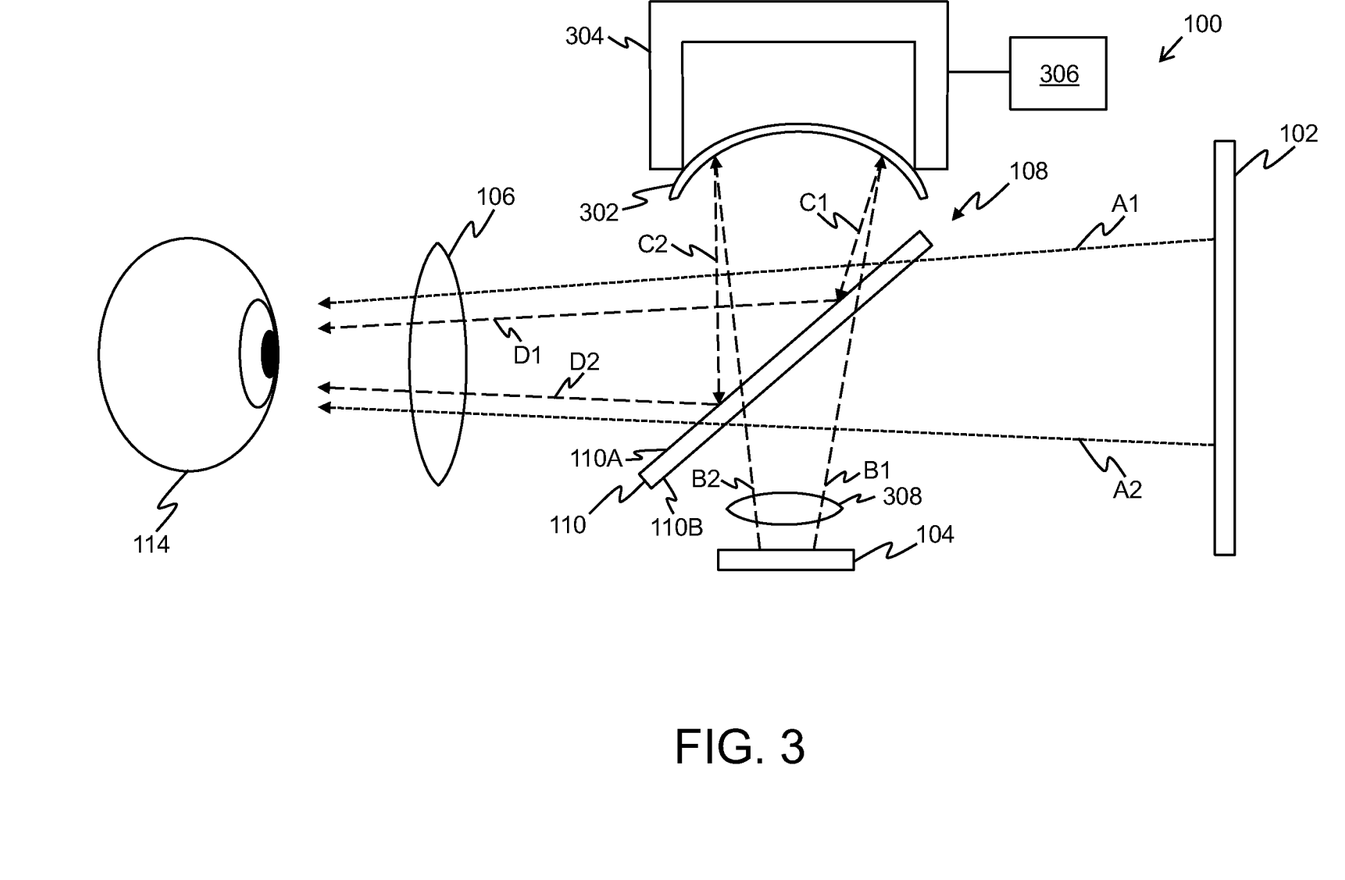

Referring to FIG. 3, illustrated is an exemplary implementation of the display apparatus 100, in accordance with yet another embodiment of the present disclosure. The display apparatus 100 is shown to include the at least one context image renderer 102, the at least one focus image renderer 104, the exit optical element 106, and the at least one optical combiner 108. As shown, the at least one optical combiner 108 comprises the first semi-transparent reflective element 110 and a second semi-transparent reflective element 302. As shown, the second semi-transparent reflective element 302 is curved in shape. Furthermore, as shown, the at least one optical combiner 108 optionally comprises at least one first actuator, depicted as a first actuator 304, for moving the second semi-transparent reflective element 302. In such an instance, the display apparatus 100 further comprises a processor 306 coupled to the at least one first actuator 304, the processor 306 being configured to control the at least one first actuator 304 to adjust a tilt of the second semi-transparent reflective element 302 to change a location of the projection of the rendered focus image incident upon the exit optical element 106. Furthermore, optionally, a lens 308 is positioned on the optical path of the projection of the rendered focus image B1-B2. The rays A1-A2 depicting the projection of the rendered context image, and the rays D1-D2 depicting the projection of the rendered focus image, are directed towards an eye 114 of a user of the display apparatus 100.

Figure 4:
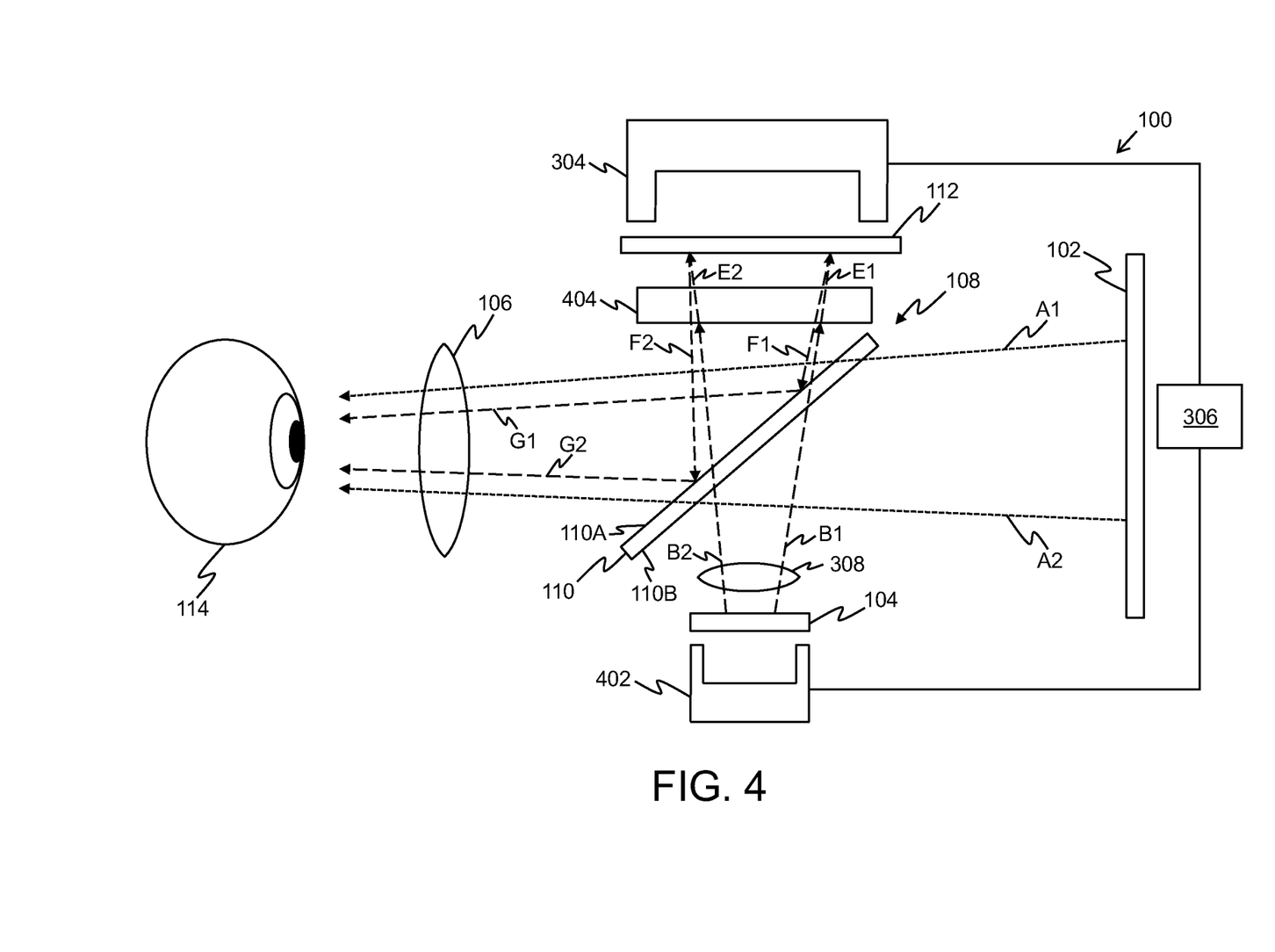

Referring to FIG. 4, illustrated is an exemplary implementation of the display apparatus 100, in accordance with yet another embodiment of the present disclosure. The display apparatus 100 is shown to include the at least one context image renderer 102, the at least one focus image renderer 104, the exit optical element 106, and the at least one one optical combiner 108. As shown, the at least one optical combiner 108 comprises the first semi-transparent reflective element 110 and the second semi-transparent reflective element 112. As shown, the at least one optical combiner 108 optionally comprises the at least one first actuator 304, for moving the second semi-transparent reflective element 112. In such an instance, the display apparatus 100 further comprises the processor 306 coupled to the at least one first actuator 304, the processor 306 being configured to control the at least one first actuator 304 to adjust a tilt of the second semi-transparent reflective element 112 to change a location of the projection of the rendered focus image incident upon the exit optical element 106. Furthermore, as shown, the at least one optical combiner 108 further comprises at least one second actuator, depicted as a second actuator 402, for moving the at least one focus image renderer 104. In such an instance, the processor 306 is coupled to the at least one second actuator 402, and is configured to control the at least one second actuator 402 to adjust a tilt of the at least one focus image renderer 104 to change the location of the projection of the rendered focus image incident upon the exit optical element 106.

Furthermore in FIG. 4, optionally, the first side 110A of the first semi-transparent reflective element 110 has polarizing properties. More optionally, a polarization retarder or retardation layer, depicted as a retardation layer 404, is positioned between the first semi-transparent reflective element 110 and the second semi-transparent reflective element 112. As shown, the projection of the rendered focus image emanating from the at least one focus image renderer 104, depicted as the rays B1-B2, is incident upon the retardation layer 404. The retardation layer 404 is optionally configured to alter polarization orientation of the projection of the rendered focus image incident thereupon, to transmit a resulting projection of the rendered focus image depicted as rays E1 and E2, towards the second semi-transparent reflective element 112. The second semi-transparent reflective element 112 reflects the projection of the rendered focus image towards the first semi-transparent reflective element 110, depicted as rays F1 and F2. The projection of the rendered focus image is then reflected from the first side 110A of the first semi-transparent reflective element 110 towards the exit optical element 106, as depicted by rays G1 and G2. Furthermore, the rays A1-A2 depicting the projection of the rendered context image, and the rays G1-G2 depicting the projection of the rendered focus image, are directed towards the eye 114 of the user of the display apparatus 100.

Figure 5:
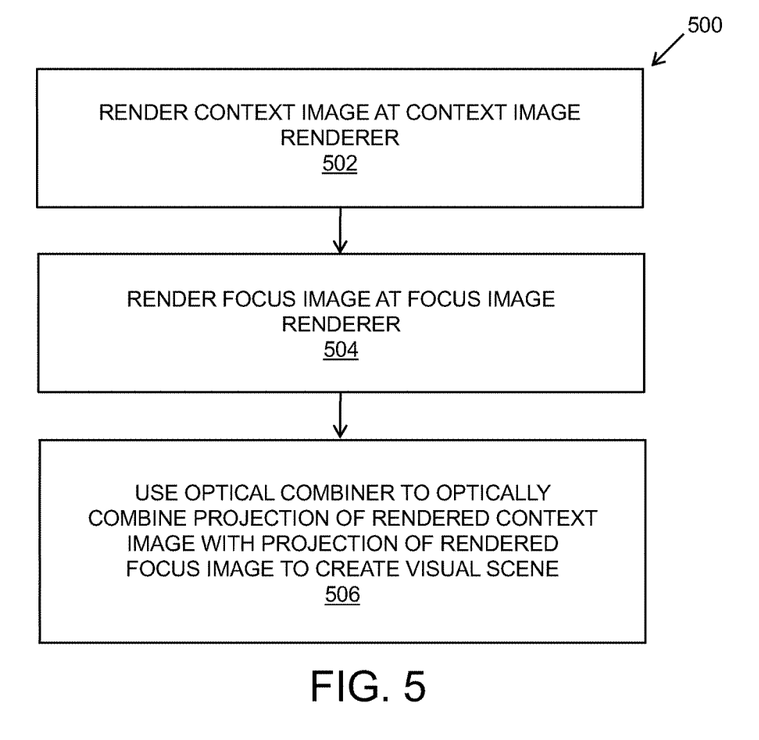
FIG. 5 illustrates steps of a method of displaying, via a display apparatus, in accordance with an embodiment of the present disclosure.

Referring to FIG. 5, illustrated are steps of a method 500 of displaying, via a display apparatus (for example, such as the display apparatus 100 of FIGS. 1-4), in accordance with an embodiment of the present disclosure. At step 502, a context image is rendered at an at least one context image renderer. At step 504, a focus image is rendered at an at least one focus image renderer. At step 506, at least one optical combiner is used to optically combine a projection of the rendered context image with a projection of the rendered focus image to create a visual scene. An angular width of the projection of the rendered context image is greater than an angular width of the projection of the rendered focus image. The at least one context image renderer is arranged in a manner that the projection of the rendered context image emanating therefrom passes through the first semi-transparent reflective element towards the exit optical element. The at least one focus image renderer is arranged in a manner that the projection of the rendered focus image emanating therefrom passes through the first semi-transparent reflective element towards the second semi-transparent reflective element, from where the projection of the rendered focus image is reflected towards the first semi-transparent reflective element, and is then reflected from the first side of the first semi-transparent reflective element towards the exit optical element.

The steps 502 to 506 are only illustrative and other alternatives can also be provided where one or more steps are added, one or more steps are removed, or one or more steps are provided in a different sequence without departing from the scope of the claims herein. As an example, the method 500 further comprises controlling at least one first actuator of the at least one optical combiner to adjust a tilt of the second semi-transparent reflective element, so as to change a location of the projection of the rendered focus image incident upon the exit optical element. As another example, the method 500 further comprises controlling at least one second actuator of the at least one optical combiner to adjust a tilt of the at least one focus image renderer, so as to change the location of the projection of the rendered focus image incident upon the exit optical element.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   at least one context image renderer for rendering a context image;
   at least one focus image renderer for rendering a focus image;
   an exit optical element; and
   at least one optical combiner for optically combining a projection of the rendered context image with a projection of the rendered focus image to create a visual scene, an angular width of the projection of the rendered context image being greater than an angular width of the projection of the rendered focus image, the at least one optical combiner comprising:
   a first semi-transparent reflective element having a first side and a second side, the first side obliquely facing the exit optical element, the second side facing the at least one context image renderer; and
   a second semi-transparent reflective element obliquely facing the first side of the first semi-transparent reflective element,
   wherein the at least one context image renderer is arranged in a manner that the projection of the rendered context image emanating therefrom passes through the first semi-transparent reflective element towards the exit optical element,
   and wherein the at least one focus image renderer is arranged in a manner that the projection of the rendered focus image emanating therefrom passes through the first semi-transparent reflective element towards the second semi-transparent reflective element, from where the projection of the rendered focus image is reflected towards the first semi-transparent reflective element, and is then reflected from the first side of the first semi-transparent reflective element towards the exit optical element.

2. The display apparatus of claim 1, wherein the first semi-transparent reflective element is static.

3. The display apparatus of claim 1, wherein the at least one optical combiner further comprises at least one first actuator for moving the second semi-transparent reflective element, the display apparatus further comprising a processor coupled to the at least one first actuator, the processor being configured to control the at least one first actuator to adjust a tilt of the second semi-transparent reflective element to change a location of the projection of the rendered focus image incident upon the exit optical element.

4. The display apparatus of claim 3, wherein the at least one optical combiner further comprises at least one second actuator for moving the at least one focus image renderer, the processor being coupled to the at least one second actuator, the processor being configured to control the at least one second actuator to adjust a tilt of the at least one focus image renderer to change the location of the projection of the rendered focus image incident upon the exit optical element.

5. The display apparatus of claim 1, wherein the first side of the first semi-transparent reflective element has polarizing properties.

6. The display apparatus of claim 5, further comprising a polarization retarder or retardation layer positioned between the first semi-transparent reflective element and the second semi-transparent reflective element.

7. The display apparatus of claim 1, wherein the second semi-transparent reflective element is curved in shape.

8. A method of displaying, via a display apparatus comprising at least one context image renderer, at least one focus image renderer, an exit optical element and at least one optical combiner, the at least one optical combiner comprising a first semi-transparent reflective element and a second semi-transparent reflective element, the first semi-transparent reflective element having a first side obliquely facing the exit optical element and a second side facing the at least one context image renderer, the second semi-transparent reflective element obliquely facing the first side of the first semi-transparent reflective element, the method comprising:
   rendering a context image at the at least one context image renderer;
   rendering a focus image at the at least one focus image renderer; and
   using the at least one optical combiner to optically combine a projection of the rendered context image with a projection of the rendered focus image to create a visual scene, an angular width of the projection of the rendered context image being greater than an angular width of the projection of the rendered focus image,
   wherein the at least one context image renderer is arranged in a manner that the projection of the rendered context image emanating therefrom passes through the first semi-transparent reflective element towards the exit optical element,
   and wherein the at least one focus image renderer is arranged in a manner that the projection of the rendered focus image emanating therefrom passes through the first semi-transparent reflective element towards the second semi-transparent reflective element, from where the projection of the rendered focus image is reflected towards the first semi-transparent reflective element, and is then reflected from the first side of the first semi-transparent reflective element towards the exit optical element.

9. The method of claim 8, further comprising controlling at least one first actuator of the at least one optical combiner to adjust a tilt of the second semi-transparent reflective element, so as to change a location of the projection of the rendered focus image incident upon the exit optical element.

10. The method of claim 9, further comprising controlling at least one second actuator of the at least one optical combiner to adjust a tilt of the at least one focus image renderer, so as to change the location of the projection of the rendered focus image incident upon the exit optical element.

* * * * *